(12) United States Patent
Watanabe (10) Patent No.: US 6,572,231 B1
(45) Date of Patent: Jun. 3, 2003

(54) PROJECTOR

(75) Inventor: Nobuo Watanabe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/518,187

(22) Filed: Mar. 2, 2000

(30) Foreign Application Priority Data

Mar. 4, 1999 (JP) .......................................... 11-057314

(51) Int. Cl.[7] .............................................. G03B 21/16
(52) U.S. Cl. .............................. 353/58; 353/60; 353/52
(58) Field of Search ............................. 353/57, 58, 60, 353/61, 52, 119

(56) References Cited

U.S. PATENT DOCUMENTS

| | | | | |
|---|---|---|---|---|
| 6,007,205 A | * | 12/1999 | Fujimori | 353/57 |
| 6,132,049 A | * | 10/2000 | Yamaguchi et al. | 353/61 |
| 6,139,155 A | * | 10/2000 | Takizawa | 353/57 |
| 6,203,159 B1 | * | 3/2001 | Takizawa | 353/61 |

FOREIGN PATENT DOCUMENTS

| | | | |
|---|---|---|---|
| JP | 02-196280 | * | 2/1990 |
| JP | U-6-28836 | | 4/1994 |
| JP | 07168160 | * | 4/1995 |
| JP | A-8-179424 | | 7/1996 |

* cited by examiner

*Primary Examiner*—William Dowling
(74) *Attorney, Agent, or Firm*—Oliff & Berridge, PLC (57) ABSTRACT

A projector is provided that includes a cooling structure which efficiently cools an electrooptic device, and which can cope with an increase in brightness of a light source and a reduction in size of the projector. A cooling fan for introducing cooling air is mounted above an air inlet, and a regulating fan for regulating the cooling air introduced by the cooling fan is mounted at a position opposing the cooling fan across an electrooptic device. For this reason, the cooling air is formed in a substantially linear shape, and the electrooptic device can be uniformly and efficiently cooled without cooling only parts of the electrooptic device. This allows a cooling structure to be obtained which can cope with an increase in brightness of a light source lamp serving as a light source and a reduction in size of a projector.

21 Claims, 7 Drawing Sheets

PROJECTOR

BACKGROUND OF THE INVENTION

1. Field of Invention

The present invention relates to a projector which includes an electrooptic device for forming an optical image according to image information, a projection lens for enlarging and projecting the image formed by the electrooptic device, and an outer casing for covering the main body including the electrooptic device.

2. Description of Related Art

Hitherto, a projector has been known which includes a light source unit having a light source, an electrooptic device for modulating light emitted from the light source to form an optical image according to image information, a projection lens for enlarging and projecting the image formed by the electrooptic device, and an outer casing for accommodating these components.

Such projectors have been widely used for multimedia presentations at conferences, academic meetings, exhibitions, and the like.

In this case, in order to sharpen the image projected by the projector, an increase in brightness of the light source lamp as a light source is facilitated.

In such a projector in which an increase in brightness of the light source lamp is facilitated, it is necessary to increase power source capacity supplied to the projector, and electric power consumption inside the projector is increased therewith.

When the brightness of the light source is increased or the electric poser consumption is increased, the heating value increases therewith, whereby the temperature inside the projector increases, and in particular, operation of the electrooptic device, which is easily affected by heat, becomes unstable due to the heat inside the projector.

For this reason, an air inlet is formed in the lower surface of the outer casing, and external air is introduced as cooling air by a cooling fan from the air inlet to cool the electrooptic device.

On the other hand, while the projector is sometimes kept installed in a conference room, or the like, for a presentation, it is sometimes brought in as necessary, or is stored in another place after use. Therefore, the projector may preferably be reduced in weight and size in order to facilitate transportation.

However, even if cooling air is introduced by the cooling fan from the air inlet formed in the lower surface of the outer casing, the cooling air is blown spirally on the electrooptic device, so that the electrooptic device is not cooled uniformly. Therefore, uniform and efficient cooling of the electrooptic device is difficult.

In addition, spiral cooling air tends to spread toward the outside of the spiral, it is difficult to guide all the cooling air toward the electrooptic device, and cooling efficiency of the electrooptic device is decreased.

Therefore, according to the above-described conventional projector, cooling efficiency is decreased, and the device is insufficient to achieve an increase in brightness of the light source and a reduction in size of the projector.

SUMMARY OF THE INVENTION

The invention provides a projector including a cooling structure which efficiently cools the electrooptic device, and which can cope with an increase in brightness of the light source and a reduction in size of the device.

A projector according to the present invention may include an electrooptic device for forming an optical image according to image information, a projection lens for enlarging and projecting the image formed by the electrooptic device, and an outer casing for covering the main body including the electrooptic device. An air inlet takes in external cooling air is formed in the outer casing. The projector may also include a cooling fan for introducing cooling air from the air inlet to cool the electrooptic device, and a regulating fan opposing the cooling fan across the electrooptic device and for regulating the cooling air introduced by the cooling fan.

According to the present invention as described above, by opposingly disposing the cooling fan and the regulating fan, the flow of the cooling air introduced by the cooling fan can be formed in a substantially uniform linear flow. For this reason, if the electrooptic device is disposed between the cooling fan and the regulating fan, it is possible to blow substantially uniform linear cooling air on the electrooptic device.

This allows the electrooptic device to be uniformly and efficiently cooled without cooling only parts of the electrooptic device, and a cooling structure can be obtained which can cope with an increase in brightness of the light source and a reduction in size of the device.

In addition, the spirally diffused cooling air that has been exhausted from the cooling fan is allowed to flow by the regulating fan so as to converge. Therefore, it is possible to increase cooling efficiency of the electrooptic device, and in this respect, a cooling structure can be obtained which can cope with an increase in brightness of the light source and a reduction in size of the device.

In the projector as described above, the cooling fan and the regulating fan may be desirably constructed so that the blast volume thereof can be varied.

Here, in order to vary the blast volume of the cooling fan and the regulating fan, the number of rotations of the fans may be controlled by, for example, changing the size of the diameter of the fans, or by changing the magnitude of voltage supplied to the fans.

If the blast volume of the cooling fan and the regulating fan is variable as described above, it is possible to set the flow of air near the electrooptic device to an optimum flow in cooling the electrooptic device. This can further increase the cooling efficiency of the electrooptic device.

Furthermore, the blast volume of the cooling fan may preferably be larger than the blast volume of the regulating fan.

Here, since the regulating fan mainly regulates the flow of the cooling air introduced by the cooling fan, the blast volume of the regulating fan may be such a degree that a directional property is imparted to the cooling air.

Therefore, even if the blast volume of the regulating fan is reduced to be less than the blast volume of the cooling fan, the electrooptic device can be sufficiently and efficiently cooled when the above-described blast volume can be obtained. Moreover, since the voltage supplied to the regulating fan may be low in proportion to the blast volume of the regulating fan, it is possible to further decrease electric power consumption inside the projector, to reduce the heating value inside the projector, and to increase the cooling efficiency of the electrooptic device.

In addition, the above-described projector may desirably include a housing for optical components for accommodating optical components, such as lenses and mirrors, and the regulating fan may desirably be fixed to the housing for optical components.

If the regulating fan is fixed to the housing for optical components as described above, it is not necessary to newly provide a pedestal for fixing the regulating fan or to fix the regulating fan to the inner surface of the outer casing, and the regulating fan can be easily fixed without complicating the structure of the inside of the projector. This can facilitate manufacturing of the projector.

Furthermore, the regulating fan may preferably be provided with a filter for covering the regulating fan, the filter may preferably include a filter member having dust blocking properties, and a filter frame provided along the periphery of the filter member, and the filter frame may preferably be fixed to the housing for optical components.

If the regulating fan is fixed to the housing for optical components as described above, the entry of dust or the like into the electrooptic device can be prevented. Moreover, by covering the periphery of the electrooptic device by, for example, the housing for accommodating optical components, such as lenses and mirrors, and by disposing the regulating fan provided with the filter above the electrooptic device, the overall electrooptic device can be covered by the filter and the housing for optical components.

This can securely prevent the entry of dust or the like into the electrooptic device, and deterioration of the projected image due to adhesion of dust, or the like, to the electrooptic device can be prevented.

In addition, a temperature detection device for detecting the temperature of cooling air near the electrooptic device may desirably be provided between the cooling fan and the regulating fan, and the cooling fan and the regulating fan may desirably be controlled by the temperature detected by the temperature detection device.

Here, the temperature detection device may preferably be constructed so as to output a detection signal to a control substrate for controlling the cooling fan and the regulating fan.

If the temperature detection device is constructed as described above, for example, when it is detected that the temperature of the electrooptic device is high, the electrooptic device can be controlled so as to be rapidly cooled by increasing the number of rotations of the cooling fan and the regulating fan. Conversely, when it is detected that the temperature of the electrooptic device is low, the electrooptic device can be controlled so as to be slowly cooled by decreasing the number of rotations of the cooling fan and the regulating fan.

Incidentally, the reference temperature with respect to a high or low detected temperature is suitably determined on the basis of experimental results, or the like.

This allows the rotation of the fans to be easily controlled according to the elevation in temperature of the electrooptic device, so that the cooling efficiency of the electrooptic device can be easily optimized.

Furthermore, the regulating fan may preferably be dismountably provided. If the regulating fan is dismountably provided as described above, the components can be shared with a projector in which the brightness of the light source lamp is not increased, in other words, the brightness of the light source lamp is low, and the regulating fan is not required.

DETAILED DESCRIPTION OF PREFERRED EMBODIMENTS

Figure 1:
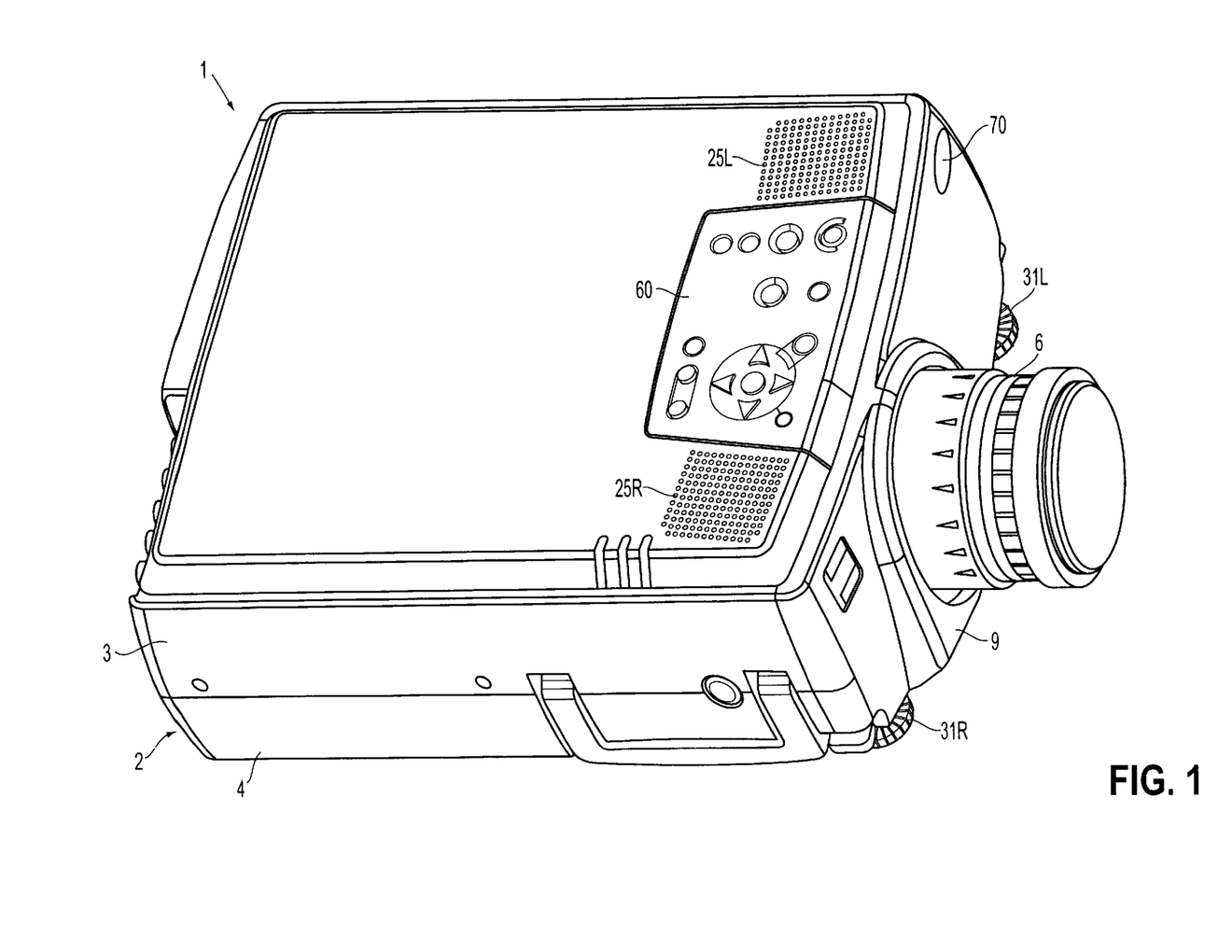
FIG. 1 is an outward perspective view of a projector according to an embodiment of the present invention, as viewed from the top side.
Figure 2:
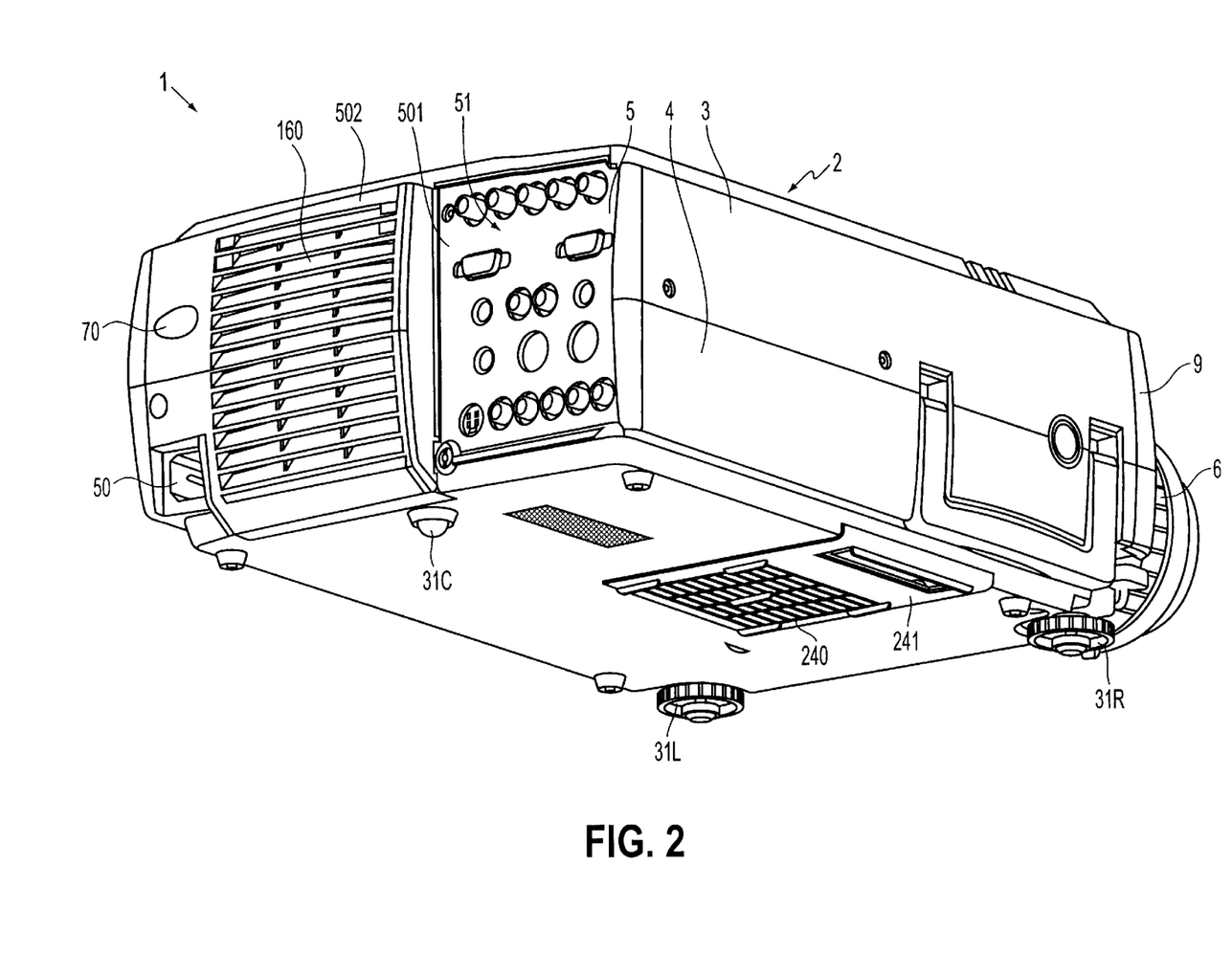
FIG. 2 is an outward perspective view of the projector in the embodiment, as viewed from the bottom side.

An embodiment of the present invention will now be described with reference to the drawings.
(1) Overall Configuration of the Projector FIGS. 1 and 2 are schematic perspective views of a projector 1 according to this embodiment. FIG. 1 is a perspective view as viewed from the top side, and FIG. 2 is a perspective view as viewed from the bottom side.

The projector 1 is of a type that separates light emitted from a light source lamp serving as a light source into three primary color light beams of red (R), green (G), and blue (B), modulates these respective color light beams according to image information through liquid crystal panels including an electrooptic device, synthesizes the modulated light beams of respective colors by a prism (optical color-synthesizing system), and enlarges and displays the synthesized light beam onto a projection plane via a projection lens 6. Components are accommodated in an outer casing 2 except a part of the projection lens 6.
(2) Structure of Outer Casing The outer casing 2 basically consists of an upper casing 3 for covering the top face of the projector 1, a lower casing 4 constituting the bottom face of the projector 1, a front casing 9 for covering the front face, and a rear casing 5 (FIG. 2) for covering a rear face, and is made of metal, such as magnesium, except that the rear casing 5 is made of resin.

As shown in FIG. 1, many communication holes 25R and 25L for speakers are formed at left and right ends of the front side of the top face of the upper casing 3. In addition, a control panel 60 for adjusting image quality and the like of the projector 1 is provided between the communication holes 25R and 25L. Furthermore, a light-receiving section 70 is provided, on one face of the projector, at the upper right portion of the front casing 9 so as to receive an optical signal from a remote controller that is not shown in the figure.

As shown in FIG. 2, in substantially a center of the bottom face of the lower casing 4, there is provided an air inlet 240 for taking in cooling air for cooling the inside of the projector 1. The air inlet 240 is provided in a filter replacement cover 241 made of resin, and the filter replacement cover 241 is attached to and detached from the side face of the lower casing 4, whereby an internal filter can be replaced.

In addition, the bottom face of the lower casing 4 is provided with, as shown in FIG. 2, feet 31R and 31L at the left and right front end corners thereof, and a foot 31C at substantially the rear end center. By controlling the amount of vertical extension or retraction of the feet 31R and 31L, the inclination of the display screen can be changed.

Figure 3:
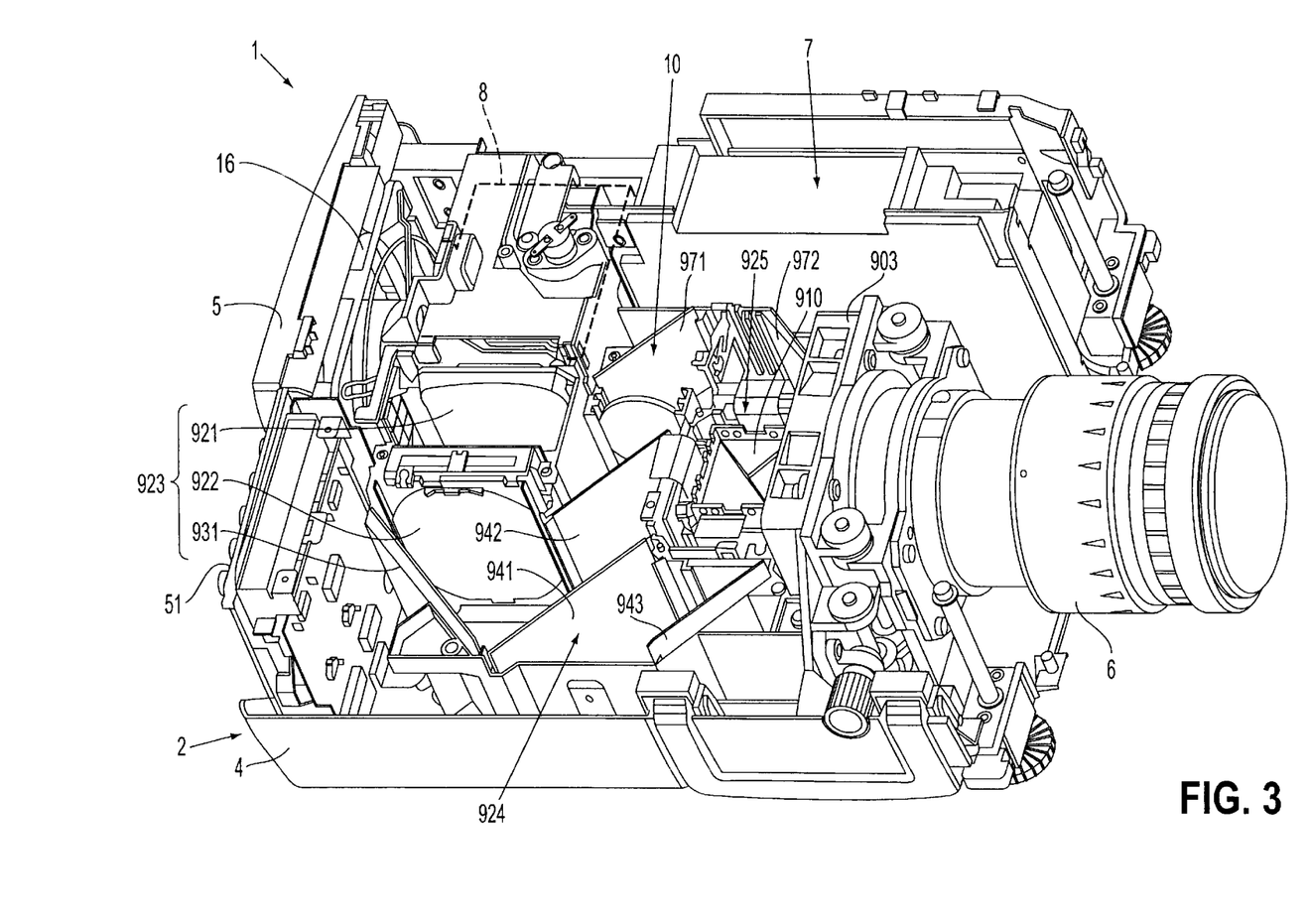
FIG. 3 is a perspective view showing the internal structure of the projector in the embodiment.

The rear casing 5 includes, as shown in FIG. 2, an interface panel 501 provided in correspondence with various types of input-output terminals 51 that are disposed adjacent to the rear face of the projector 1, and a light source lamp-replacement cover 502 provided with an air outlet 160 serving as a ventilation hole for exhausting air inside the projector 1 and a light-receiving section 70. In addition, an AC inlet 50 for supplying external electric power is disposed on the rear face of the projector 1. (3) Internal Structure of the Device FIG. 3 shows the internal structure of the projector 1. As shown in this figure, a power supply unit 7 serving as a power supply disposed on one side of a projection lens 6, a light source lamp unit 8 serving as a light source unit disposed rearward of the power supply unit 7, an optical unit 10 constituting an optical system, a driver board 17 (FIG. 6) for driving an electrooptic device 925 provided in the unit 10, and a main board 18 (FIG. 6) for controlling the overall projector 1 are accommodated in the projector 1.

The power supply unit 7 transforms electric power from the AC inlet 50 to supply the power to the light source lamp unit 8, the driver board 17, the main board 18, fans 301 and 302 (FIG. 6) disposed both above and below the electrooptic device 925, and an exhaust fan 16 disposed rearward of the light source lamp unit 8, and includes a lamp-driving board for driving a light source lamp 181 of the light source lamp unit 8, in addition to a power-supply circuit board having a power supply filter, a transformer, a rectifying circuit, a smoothing circuit, and a voltage-regulating circuit, etc. formed thereon.

Figure 4:
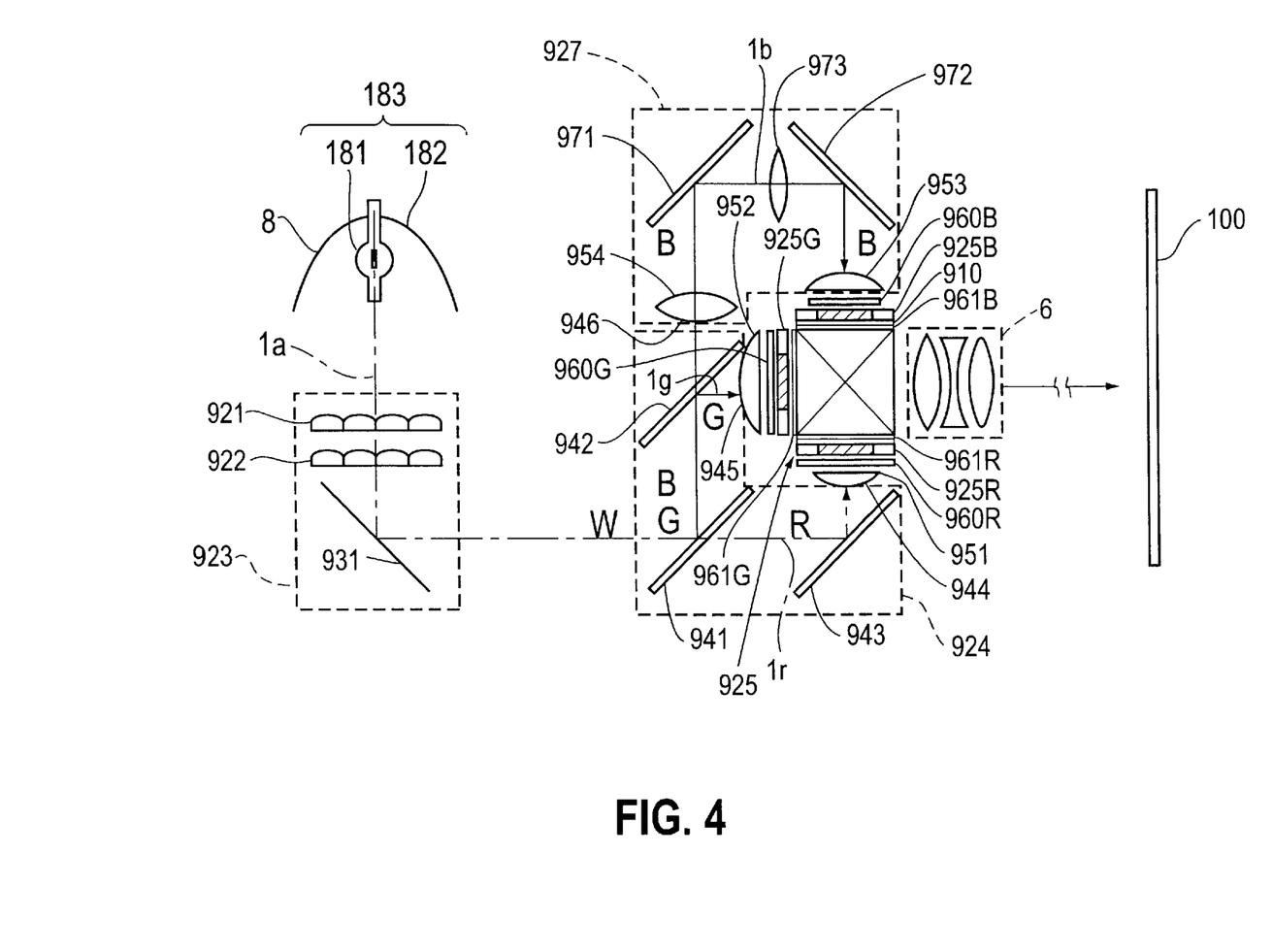
FIG. 4 is a schematic diagram for the explanation of a structure of an optical system in the embodiment.

The light source lamp unit 8 includes a light source portion of the projector 1, and includes, as shown in FIG. 4, the light source device 183 consisting of a light source lamp 181 and a reflector 182, and a lamp housing (not shown) for accommodating the light source device 183. Such a light source lamp unit 8 is cooled by cooling air from the above-described fan 301 and cooling air drawn from a clearance between the outer casing 2 and the projection lens 6. The cooling air first cools the electrooptic device 925 and the power supply unit 7 immediately after being drawn, then flows rearward so as to cool almost all the area inside the projector 1, and most of the cooling air finally passes through the light source lamp unit 8 to be exhausted by the exhaust fan 16 provided behind the light source lamp unit 8. Therefore, the light source lamp unit 8 is disposed just in front of the exhaust fan 16, whereby the light source device 183 inside thereof can be efficiently cooled by a large volume of the cooling air.

The optical unit 10 is a unit for optically processing light emitted from the light source lamp unit 8 to form an optical image corresponding to image information, and includes an optical illuminating system 923, an optical color separation system 924, an electrooptic device 925, and a prism unit 910 serving as an optical color-synthesizing system. The optical elements of the optical unit 10 other than the electrooptic device 925 and the prism unit 910 are vertically held between upper and lower light guides 901 and 902 (FIG. 6) that are housings for optical components. The upper light guide 901 and the lower light guide 902 are integrally formed, and are fixed by fixing screws to the lower casing 4. In addition, these light guides 901 and 902 are similarly fixed by fixing screws to the prism unit 910.

Figure 5:
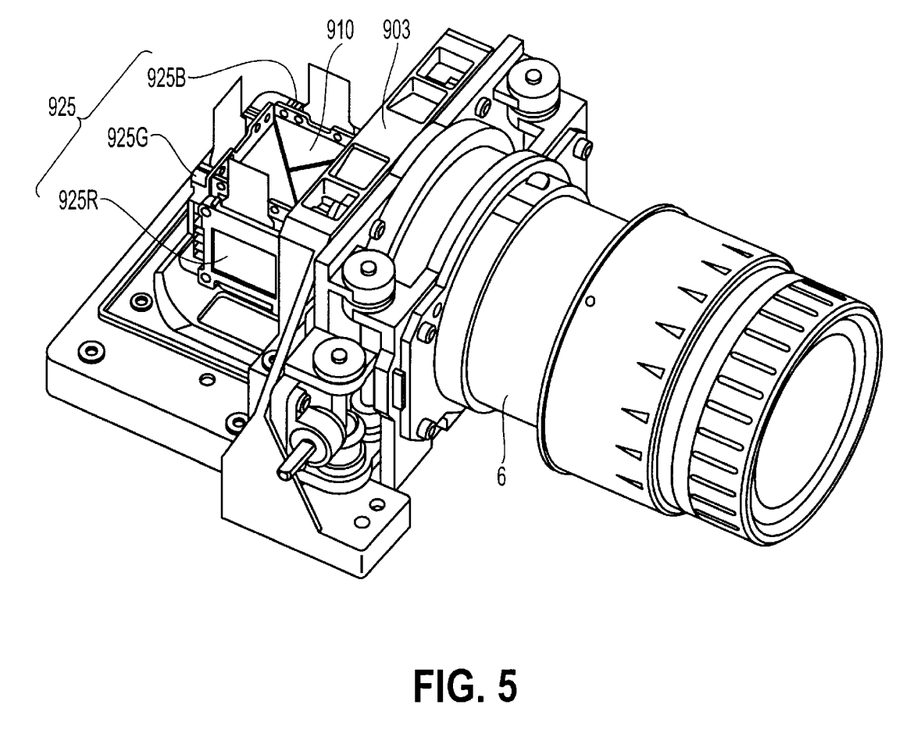
FIG. 5 is a perspective view showing the components of the embodiment.

The prism unit 910 shaped like a rectangular parallelepiped is, as shown in FIG. 5, fixed by fixing screws to a back face of a head body 903 having substantially an L-shaped side face that is composed of an integrally molded article of magnesium. In addition, liquid crystal panels 925R, 925G, and 925B constituting the electrooptic device 925 are fixed via fixing members to three side faces of the prism unit 910.

The driver board 17 is intended for driving and controlling the liquid crystal panels 925R, 925G, and 925B of the electrooptic device 925, and is disposed above the optical unit 10.

The main board 18 has a control circuit formed thereon for controlling the overall projector 1, and is disposed above the driver board 17. Such a main board 18 is electrically connected to the driver board 17 and the control panel 60.

(4) Structure of Optical System

Next, the structure of an optical system of the projector 1, that is, the optical unit 10 will be described with reference to a schematic diagram shown in FIG. 4.

As described above, the optical unit 10 includes the optical illuminating system 923 for producing a uniform in-plane illuminance distribution of light (W) from the light source lamp unit 8, the optical color separation system 924 for separating the light (W) from the optical illuminating system 923 into light beams of red (R), green (G), and blue (B), the electrooptic device 925 for modulating color light beams R, G, and B according to image information, and the prism unit 910 serving as an optical color-synthesizing system for synthesizing the modulated color light beams.

The optical illuminating system 923 includes a first lens plate 921, a second lens plate 922 disposed on the emitting side of the first lens plate 921, and a reflecting mirror 931 for bending an optical axis $1a$ of the light W emitted from the light source lamp unit 8 toward the front of the projector 1.

The first lens plate 921 has a plurality of rectangular lenses arranged in the form of a matrix, divides the light emitted from the light source into a plurality of subbeams, and condenses the sub-beams near the second lens plate 922.

The second lens plate 922 has a plurality of rectangular lenses arranged in the form of a matrix, and has the function of superimposing the sub-beams emitted from the first lens plate 921 onto the liquid crystal panels 925R, 925G, and 925B (described hereinbelow) constituting the electrooptic device 925.

In this way, according to the projector 1 of this embodiment, the liquid crystal panels 925R, 925G, and 925B can be illuminated with light having substantially uniform illuminance by the illuminating optical system 923, so that a projected image having no illuminance variations can be obtained.

The optical color separation system 924 consists of a blue-and-green-reflecting dichroic mirror 941, a green-reflecting dichroic mirror 942, and a reflecting mirror 943. First, a blue light beam B and a green light beam G contained in the light W emitted from the optical illuminating system 923 are reflected at right angles by the blue-and-green-reflecting dichroic mirror 941, and are directed toward the green-reflecting dichroic mirror 942.

A red light beam R passes through the blue-and-green-reflecting dichroic mirror 941, is reflected at a right angle by the rearward reflecting mirror 943, and is emitted from an emitting section 944 for the red light beam R toward the prism unit 910.

Next, only the green light beam G in the blue and green light beams B and G reflected by the blue-and-green-reflecting dichroic mirror 941 is reflected at a right angle by the green-reflecting dichroic mirror 942, and is emitted from an emitting section 945 for the green light beam G toward the prism unit 910.

The blue light beam B passing through the green-reflecting dichroic mirror 942 is emitted from an emitting section 946 for the blue luminous flux B toward an optical relay system 927. In this embodiment, all the distances between the emitting section for the light beam W of the optical illuminating system and the emitting sections 944, 945, and 946 for the color light beams R, G, and B in the optical color separation system 924 are set to be equal.

Condenser lenses 951 and 952 are disposed on emitting sides of the emitting sections 944 and 945 for the red and green light beams R and G in the optical color separation system 924. Therefore, the red and green light beams R and G emitted from the emitting sections enter the condenser lenses 951 and 952, where they are collimated.

The thus-collimated red and green light beams[luminous fluxes] pass through incident-side polarizers 960R, 960G, and enter the liquid crystal panels 925R and 925G serving as optical modulation devices, where they are modulated and given image information corresponding to light of respective colors. That is, these liquid crystal panels 925R and 925G are subjected to switching control according to image information by the driver board 17, whereby the light of respective colors passed therethrough is modulated.

On the other hand, the blue light beam B is guided to the corresponding liquid crystal panel 925B via the optical relay system 927, where it is similarly modulated according to image information. As the liquid crystal panels 925R, 925G, and 925B of this embodiment, for example, liquid crystal panels may be employed that use a polysilicon TFT as a switching element.

The optical relay system 927 consists of a condenser lens 954 disposed on an emitting side of the emitting section 946 for the blue light beam B, an incident-side reflecting mirror 971, an emitting-side reflecting mirror 972, an intermediate lens 973 disposed between the reflecting mirrors, and a condenser lens 953 disposed before the liquid crystal panel 925B, and the blue light beam B emitted from the condenser lens 953 passes through the incident-side polarizer 960B to enter the liquid crystal panel 925B, where it is modulated.

In this case, the optical axis 1a of the light W, and optical axes 1r, 1g, and 1b of the color light beams R, G, and B are formed in the same plane. The blue light beam B has the longest optical path length, that is, the distance between the light source lamp 181 and the liquid crystal panel for the blue light beam B is the longest and therefore, the light amount of the light beam to be lost is the largest. The light loss can, however, be reduced by interposing the optical relay system 927 therebetween.

Next, the color light beams R, G, and B modulated through the liquid crystal panels 925R, 925G, and 925B pass through emitting-side polarizers 961R, 961G, and 961B to be allowed to enter the prism unit 910, where they are synthesized. A color image synthesized by the prism unit 910 is enlarged and projected via the projection lens 6 onto a projection plane 100 located at a predetermined position.

(5) Cooling Structure of the Electrooptic Device

Figure 6:
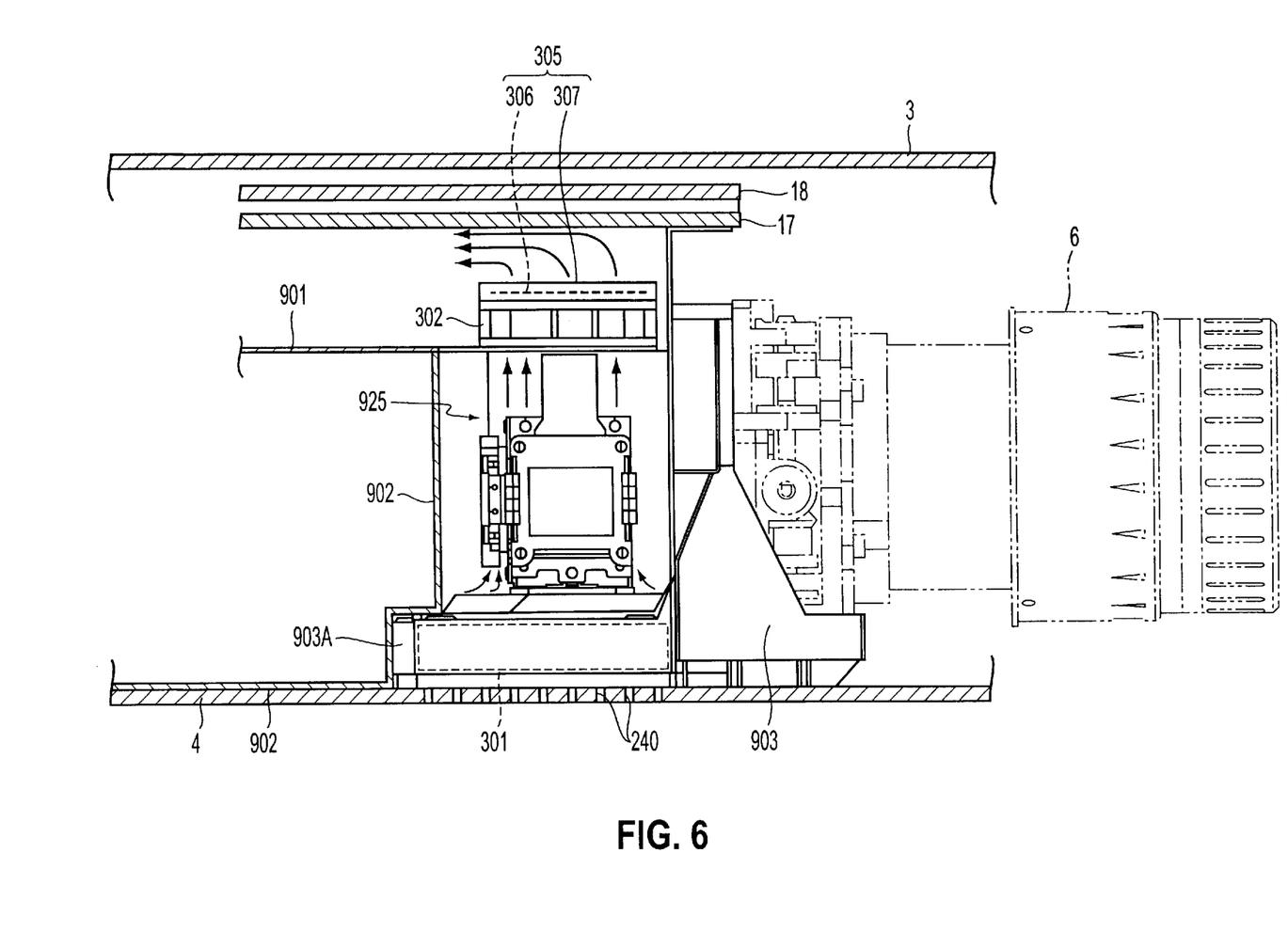
FIG. 6 is a sectional view of the projector in the embodiment.
Figure 7:
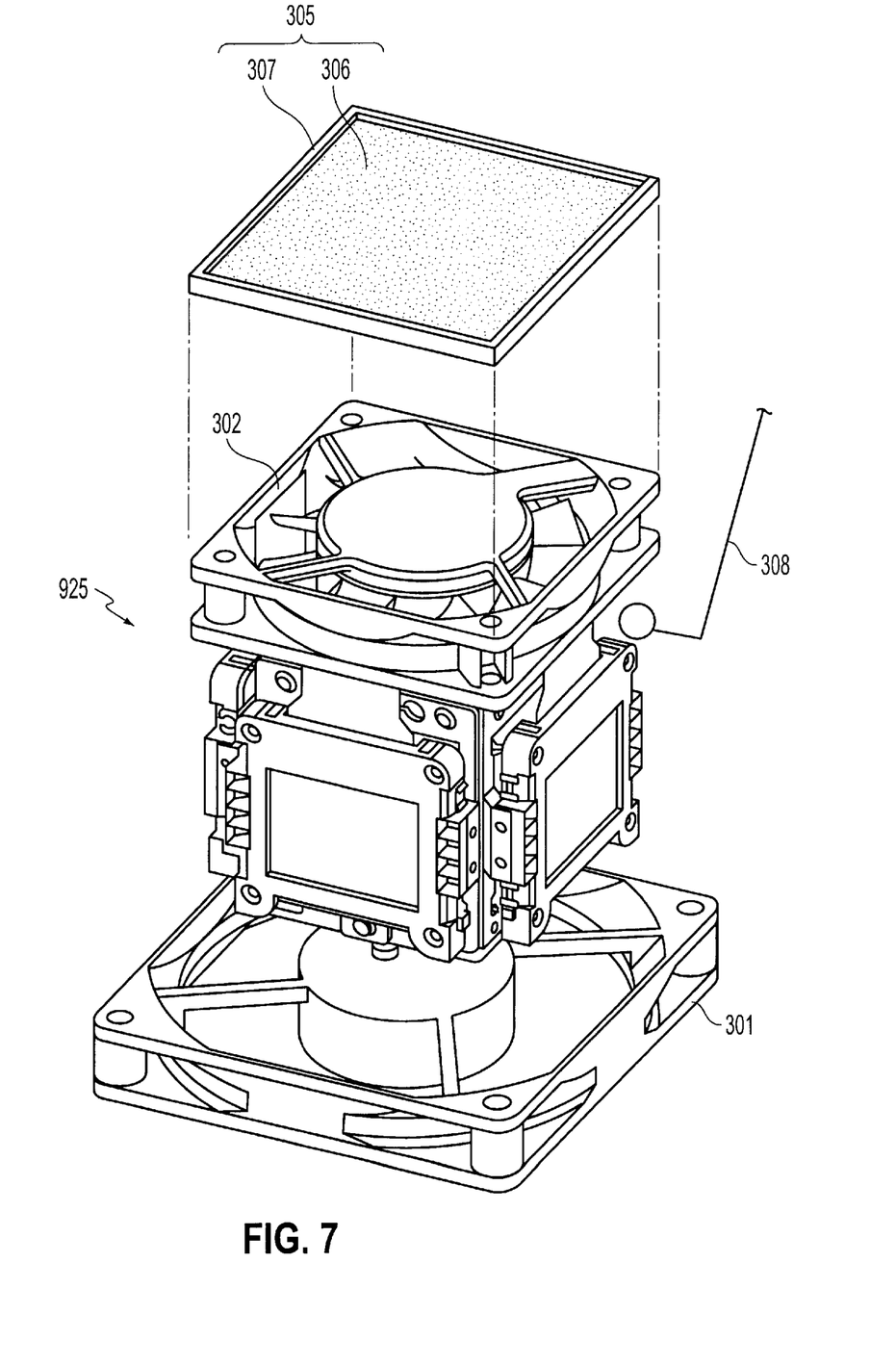
FIG. 7 is a perspective view showing a cooling structure of an electrooptic device in the embodiment.

FIGS. 6 and 7 show a cooling structure of the electrooptic device 925 in the above-described projector 1.

A bottom face section 903A of the head body 903 having substantially an L-shaped side face is disposed above the air inlet 240 of the lower casing 4, and the electrooptic device 925 is placed on the top face of the bottom face section 903A. The periphery of the electrooptic device 925 is covered with the rear faces of the lower light guide 902 and the head body 903, and the rear faces constitute a duct so that cooling air is easily introduced to the electrooptic device 925.

A cooling fan 301 for introducing external air as cooling air from the air inlet 240 to cool the electrooptic device 925 is accommodated in the bottom face section 903A. The cooling fan 301 is fixed by screws or the like to the bottom face section 903A of the head body 903. Here, the cooling fan 301 has substantially the same size as the bottom face section 903A, and is formed in a planar quadrilateral shape.

A regulating fan 302, opposing the above-described cooling fan 301 across the electrooptic device 925, for regulating the cooling air introduced by the cooling fan 301 is provided above the electrooptic device 925.

This allows the flow of the cooling air introduced by the cooling fan 301 to be a substantially uniform linear flow such that the cooling air flows from the cooling fan 301 so as to converge on the regulating fan 302 without being diffused spirally, as shown by the arrows in FIG. 6. For this reason, almost all of the substantially linear cooling air is blown on the electrooptic device 925 located between the cooling fan 301 and the regulating fan 302.

In addition, the regulating fan 302 is dismountably fixed by screws or the like to the upper light guide 901 at an edge thereof. The diameter of the regulating fan 302 is less than that of the cooling fan 301, whereby the blast volume of the cooling fan 301 is increased to be larger than the blast volume of the regulating fan 302.

Here, an intake-side opening of the regulating fan 302 is formed so as to cover the three liquid crystal panels 925R, 925G, and 925B provided directly below the regulating fan 302 when viewed in plan, whereby cooling air near the liquid crystal panels 925R, 925G, and 925B can be efficiently drawn upward.

The blast volumes of the cooling fan 301 and the regulating fan 302 can also be varied by changing the magnitude of the voltage supplied to the fans 301 and 302 so as to control the number of rotations of the fans 301 and 302.

Here, since the regulating fan 302 mainly regularizes the flow of the cooling air introduced by the cooling fan 301, the blast volume of the regulating fan 302 is set to such a degree that a directional property is imparted to the cooling air.

On the top face of the regulating fan 302, there is provided a filter 305 for covering the top face. The filter 305 includes a filter member 306 having dust blocking properties and a filter frame 307 provided along the periphery of the filter member 306, and is fixed to the upper light guide 901 via the regulating fan 302. Therefore, the overall electrooptic device 925 is covered by the filter 305, the head body 903, and the lower light guide 902.

A thermo-sensor 308 which is a temperature detection device is provided between the cooling fan 301 and the regulating fan 302, more specifically, near the upper part of the electrooptic device 925. The thermo-sensor 308 consists of a thermistor for detecting the temperature of the cooling air after cooling the liquid crystal panels 925R, 925G, and 925B.

The thermo-sensor 308 outputs a temperature detection signal to the main board 18. The main board 18 controls the voltage supplied to the fans 301 and 302 by the signal from the thermo-sensor 308 so as to control the number of rotations of the fans 301 and 302.

In other words, when it is detected by the thermo-sensor 308 that the temperature of the electrooptic device 925 is high, the number of rotations of the cooling fan 301 and the regulating fan 302 is increased by the control action of the main board 18, and the electrooptic device 925 is rapidly cooled. Conversely, when it is detected that the temperature of the electrooptic device 925 is low, the number of rotations of the cooling fan 301 and the regulating fan 302 is decreased by the control action of the main board 18, and the electrooptic device 925 is cooled slowly. The reference temperature with respect to a high or low detected temperature is suitably determined on the basis of the results of experiment and the like.

A process of cooling the electrooptic device 925 will now be described. First, cooling air is forcibly taken into the projector 1 from the air inlet 240 by the rotation of the cooling fan 301. The flow of the taken-in cooling air is regularized by the regulating fan 302 into substantially a uniform linear flow, without being diffused spirally, and almost all of the cooling air is blown on the electrooptic device 925. The blown air passes through the regulating fan 302 and the filter 305, flows along the driver board 17, cools the light source lamp unit 8 and the power supply unit 7, etc., and is exhausted by the exhaust fan 16 to the outside of the projector 1.

(6) Advantages of the Embodiment

The above-described embodiment provides the following advantages.

That is, since the cooling fan 301 and the regulating fan 302 are opposingly disposed, and substantially uniform linear cooling air is blown on the electrooptic device 925, the electrooptic device 925 can be uniformly and efficiently cooled without cooling only parts of the electrooptic device 925. This allows a cooling structure to be obtained which can cope with an increase in brightness of the light source lamp 181 and a reduction in size of the projector 1.

In addition, since almost all of the cooling air is blown on the electrooptic device 925, cooling efficiency of the electrooptic device can be further increased, and a cooling structure can be obtained which can cope with an increase in brightness of the light source lamp 181 and a reduction in size of the projector 1 in this respect.

Also, since the blast volume of the cooling fan 301 and the regulating fan 302 is variable, the flow of air near the electrooptic device 925 can be set to an optimum flow when cooling the electrooptic device 925. This can further increase the cooling efficiency of the electrooptic device 925.

Furthermore, since the blast volume of the regulating fan 302 is set to such a degree that a directional property is imparted to the cooling air and is set to be smaller than the blast volume of the cooling fan, the electrooptic device 925 can be sufficiently and efficiently cooled. Moreover, since the voltage supplied to the regulating fan 302 may be low in proportion to the blast volume of the regulating fan 302, electric power consumption inside the projector 1 can be further decreased, the heating value inside the projector 1 can be reduced, and the cooling efficiency of the electrooptic device 925 can be increased.

In addition, since the regulating fan 302 is fixed to the upper light guide 901, the regulating fan 302 can be easily fixed without the inner structure of the projector 1 being complicated. This can facilitate manufacturing of the projector 1.

Furthermore, since the overall electrooptic device 925 is covered with the filter 305 and the lower light guide 902, the entry of dust or the like into the electrooptic device 925 can be securely prevented, and deterioration of the projected image due to adhesion of dust or the like to the electrooptic device 925 can be prevented.

In addition, since the thermo-sensor 308 is provided near the upper part of the electrooptic device 925, the rotation of the fans 301 and 302 can be easily controlled according to the elevation in temperature of the electrooptic device 925, and the cooling efficiency of the electrooptic device 925 can be easily optimized.

Furthermore, since the regulating fan 302 is dismountably provided, the components can be shared with a projector in which the brightness of the light source lamp 181 is not increased, in other words, the brightness of the light source lamp 181 is low, and the regulating fan 302 is not required.

(7) Modifications of the Embodiment

The present invention is not limited to the above-described embodiment, and includes the following modifications.

For example, while the regulating fan 302 is dismountable in the above embodiment, the regulating fan 302 may be integrally formed with the upper light guide 901.

In addition, while the thermo-sensor 308 is provided between the cooling fan 301 and the regulating fan 302 to control the fans 301 and 302 in the above embodiment, the electrooptic device 925 may be controlled by a timer or the like so as to be rapidly cooled for every fixed period of time.

Furthermore, while the regulating fan 302 is provided with the filter 305 in the above embodiment, the regulating fan 302 is not limited thereto, and the filter 305 may not necessarily provided if the number of rotations of the regulating fan 302 is increased to such a degree that dust does not enter into the electrooptic device 925.

In addition, while the regulating fan 302 is fixed to the upper light guide 901 in the above embodiment, the fixation of the regulating fan 302 is not limited thereto, and for example, a pedestal may be separately provided inside the projector 1, and the regulating fan 302 may be fixed to the pedestal, or may be fixed to the inner surface of the outer casing 2.

Furthermore, while the blast volume of cooling fan 301 is set to be larger than the blast volume of the regulating fan 302 in the above embodiment, the magnitude of the blast volume is not limited thereto. When it is desired to regularize cooling air further efficiently, the blast volume of the cooling fan 301 may be set less than the blast volume of the regulating fan 302, and the magnitude of the blast volume may be suitably determined in carrying out the present invention.

In addition, while the blast volume of the cooling fan 301 and the regulating fan 302 is variable in the above embodiment, it may not be variable if the optimum blast value for cooling the electrooptic device 925 is derived from, for example, an experiment and the blast volume is set to the fans 301 and 302 in advance.

Furthermore, while the electrooptic device 925 is composed of TFT-drive liquid crystal panels 925R, 925G, and 925B in the above embodiment, the present invention may be applied to a projector including an optical modulation device formed by another driving method.

While the electrooptic device 925 is composed of the three liquid crystal panels 925R, 925G, and 925B in the above embodiment, the present invention may be applied to an optical modulation device composed of a single or two liquid crystal panels.

In addition, while the panels constituting the electrooptic device 925 are composed of liquid crystal elements in the above embodiment, the present invention may be applied to a projector including an optical modulation device composed of device panels using plasma elements or micromirrors other than the liquid crystal.

Furthermore, while the electrooptic device 925 in the above embodiment is of a type that transmits and modulates light beams R, G, and B, the present invention may be applied to a projector including a reflective optical modulation device which modulates while reflecting and emits incident light.

Other specific structures, shapes, and the like for carrying out the present invention may be replaced with other structures and the like as long as the object of the present invention can be achieved.

According to the present invention as described above, the projector includes the cooling fan for introducing cooling air from the air inlet to cool the electrooptic device, and the regulating fan provided opposing the cooling fan across the electrooptic device and for regulating the cooling air introduced by the cooling fan. Therefore, the cooling air can be formed in a substantially linear shape. This allows an advantage to be provided that the projector can include a cooling structure which efficiently cools the electrooptic device, and which can cope with an increase in brightness of the light source and a reduction in size of the device.

What is claimed is:

1. A projector, comprising:
   an electrooptic device that forms an optical image according to image information;
   a projection lens that enlarges and projects the image formed by the electrooptic device;
   an outer casing that covers the main body including the electrooptic device;
   an air inlet that takes in external cooling air, the air inlet being formed in the outer casing;
   a cooling fan that introduces the cooling air into the projector from the air inlet to cool the electrooptic device; and
   a regulating fan that is positioned to oppose the cooling fan across the electrooptic device to regulate the cooling air introduced by the cooling fan;
   an air blast volume of the cooling fan being larger than an air blast volume of the regulating fan.

2. The projector according to claim 1, the air blast volume from the cooling fan and the regulating fan being variable.

3. The projector according to claim 1, further comprising an optical component housing that accommodates optical components of the projector, the optical components including lenses and mirrors.

4. The projector according to claim 3, the regulating fan being fixed to the optical component housing.

5. The projector according to claim 4, the regulating fan being provided with a filter that covers the regulating fan.

6. The projector according to claim 5, the filter including a filter member having dust blocking properties, and a filter frame provided along the periphery of the filter member.

7. The projector according to claim 6, the filter frame being fixed to the optical component housing.

8. The projector according to claim 1, further comprising a temperature detector that detects the temperature of cooling air near the electrooptic device.

9. The projector according to claim 8, the temperature detector being provided between the cooling fan and the regulating fan.

10. The projector according to claim 8, the cooling fan and the regulating fan being controlled by the temperature detected by the temperature detection device.

11. The projector according to claim 9, the cooling fan and the regulating fan being controlled by the temperature detected by the temperature detection device.

12. The projector according to claim 1, the regulating fan being dismountably provided.

13. A projector, comprising:
    an electrooptic device that forms an optical image according to image information;
    a projection lens that enlarges and projects the image formed by the electrooptic device;
    an outer casing that covers the main body including the electrooptic device;
    an air inlet that takes in external cooling air, the air inlet being formed in the outer casing;
    a cooling fan that introduces the cooling air into the projector from the air inlet to cool the electrooptic device;
    a regulating fan that is positioned to oppose the cooling fan across the electrooptic device to regulate the cooling air introduced by the cooling fan; and
    an optical component housing that accommodates optical components of the projector, the optical components including lenses and mirrors, the regulating fan being dismountably fixed to the optical component housing;
    an air blast volume of the cooling fan being larger than an air blast volume of the regulating fan.

14. The projector according to claim 13, the air blast volume from the cooling fan and the regulating fan being variable.

15. The projector according to claim 13, the regulating fan being provided with a filter that covers the regulating fan.

16. The projector according to claim 15, the filter including a filter member having dust blocking properties, and a filter frame provided along the periphery of the filter member.

17. The projector according to claim 16, the filter frame being fixed to the optical component housing.

18. The projector according to claim 13, further comprising a temperature detector that detects the temperature of cooling air near the electrooptic device.

19. The projector according to claim 18, the temperature detector being provided between the cooling fan and the regulating fan.

20. The projector according to claim 19, the cooling fan and the regulating fan being controlled by the temperature detected by the temperature detection device.

21. The projector according to claim 20, the cooling fan and the regulating fan being controlled by the temperature detected by the temperature detection device.

* * * * *